United States Patent [19]

Hager

[11] Patent Number: 5,614,143
[45] Date of Patent: Mar. 25, 1997

[54] HOLLOW BODY SUCH AS A GOLF-CLUB HEAD, MADE OF MOLDED THERMOPLASTIC MATERIAL COMPRISING AN IMPRISONED INSERT, AND METHOD FOR THE MANUFACTURE THEREOF

[75] Inventor: Daniel Hager, Farges les Chalon, France

[73] Assignee: Ozen S.A., France

[21] Appl. No.: 219,650

[22] Filed: Mar. 29, 1994

[30] Foreign Application Priority Data

Mar. 29, 1993 [FR] France .................. 93 03818

[51] Int. Cl.⁶ .................................. A63B 53/04
[52] U.S. Cl. .................. 264/221; 473/324; 473/345; 264/317
[58] Field of Search ............. 273/167 R, 167 A, 273/169, 167 H, 167 F, 170, 171, 172, 173, 193 R, 194 R, DIG. 23, 73 C, 73 J; 264/DIG. 7, 317, 279, 221, 271.1, DIG. 44, 46.6; 425/324.1, 549, 577, 256; 473/324, 345

[56] References Cited

U.S. PATENT DOCUMENTS

| 3,571,900 | 3/1971 | Hardesty | 273/173 |
|---|---|---|---|
| 4,545,580 | 10/1985 | Tomita | 273/167 R |
| 4,614,627 | 9/1986 | Curtis | 273/167 H |
| 4,883,623 | 11/1989 | Nagamoto | 273/167 R |
| 5,306,450 | 4/1994 | Okumoto | 273/167 H |

FOREIGN PATENT DOCUMENTS

| 1366921 | 6/1964 | France . |
| 2477462 | 9/1981 | France . |
| 2556645 | 6/1985 | France . |
| 2559096 | 8/1985 | France . |
| 1807193 | 5/1970 | Germany . |
| 2128539 | 5/1984 | United Kingdom . |
| 2240481 | 7/1989 | United Kingdom . |
| 2212406 | 7/1989 | United Kingdom . |

*Primary Examiner*—Sebastiano Passaniti
*Attorney, Agent, or Firm*—Ostrolenk, Faber, Gerb & Soffen, LLP

[57] ABSTRACT

A method of manufacturing a hollow body such as a golf club head, having an external hollow body of molded thermal plastic material and an insert in the hollow by which it is possible to adjust the position of the center of gravity and the weight of the hollow body. An insert which is to remain within the hollow body is overmolded with a soft fusible metal to define with the insert a shape for the interior hollow of the hollow body. The hollow body of plastic material is overmolded over the combination of the insert and the overmolded core. The insert is then melted without melting the hollow body around it, and the melted insert material is removed from within the hollow body. For holding the insert and/or the fusible material core in place during the overmolding, either the insert is so shaped or a pin passes through the overmolded region defining an opening in the molded body through which the fusible material may be removed later, and that opening may be plugged.

15 Claims, 3 Drawing Sheets

5,614,143

HOLLOW BODY SUCH AS A GOLF-CLUB HEAD, MADE OF MOLDED THERMOPLASTIC MATERIAL COMPRISING AN IMPRISONED INSERT, AND METHOD FOR THE MANUFACTURE THEREOF

BACKGROUND OF THE INVENTION

The present invention relates to thin-walled hollow bodies intended to contain one or more inserts. A typical example of such a part consists of a molded golf-club head of injectable thermoplastic material within which a mass is to be arranged. Both the weight and the position of the mass must be adjustable to optimize the function of the center of gravity and the weight of the part obtained, and thus the size and direction of the force which the player will impart to it upon its use.

French patent publication A-2 645 447 describes a golf-club head made from a molded hollow body of plastic which is open on one face. The mass which will impart the necessary inertia to the club is arranged within the cavity of the hollow body, and the body is then closed by a closure piece which is attached to it in suitable manner. This process enables production of a golf club of injected thermoplastic material having a mass which is suitable in weight and position in the club head, but the manufacture of such a club is relatively complicated and expensive.

French patent publication A-2 657 530 also proposes making a golf-club head from a closed hollow body of plastic having a filling orifice within itself which there is arranged a filling orifice which makes it possible to introduce a suitable material, for instance, being relatively expensive, this process also does not, in actual practice, permit adjustment of the weight and still less of the position of the mass within the golf-club head in a desired manner.

Another embodiment, proposed in French patent publication A-2 625 105, consists in molding the complete part in a single operation, with the volume and shape desired. Removable parts which create larger or smaller cavities within the molded part are introduced into the molded part. This process does not permit precise adjustment of the weight of the mass of the golf-club head obtained, nor precise adjustment of the function of its center of gravity.

SUMMARY OF THE INVENTION

The object of the present invention is to remedy the above-mentioned drawbacks by making it possible to produce, in a single molding operation, hollow bodies of plastic material within which it is possible to arrange, as desired, at least one insert of suitable shape, volume and weight at a predetermined, selected place.

Such parts can be produced by the well-known technique of fusible core molding which is described in the applicant's French patent publications A-1 366 921 and A-2 477 462, and is applied to hollow bodies of plastic having an insert in the applicant's French patent publications A-2 556 645 and 2 559 096, as well as in German patent A-1 807 193.

In accordance with this technique, the inserts intended to be arranged within the body of thermoplastic material are overmolded with a core made of a fusible soft metal having a melting point which is judiciously selected so as to be able to withstand the phase of injection of the covering of plastic material but is such that this core can be melted after the molding of the part and extracted from it by simple drainage of the molten metal, without harming the shape or integrity of the covering.

This technique is applied particularly well to the manufacture of golf-club heads of plastic material. The insert, which is of suitable size and weight, is first overmolded by a fusible core, and this assembly is then arranged in the cavity of the covering to be molded, where it is held in place by a suitable pin which is retained in the fusible core and produces in the outer envelope which has thus been molded a hole which closed subsequently by a suitable plug, as will be seen below.

The injection of the part is advantageously effected at a point located opposite the place of location of the pin which holds the assembly formed by the insert and its fusible core together, or at least at such a point that the effects resulting from the high filling pressures tend to push the assembly back onto its seat on said holding pin.

It may be of interest in certain cases to use this pin in order to provide the means for transferring heat by means of fluid circulation, heat conduction, or a similar process in order, in this way, to adjust the temperature of the assembly formed by the insert and the fusible core during the phase of the injection and cooling of the part, so as to avoid incipient melting of the fusible portion of the core.

In a variant embodiment, it may be advantageous to replace the holding pin of the assembly consisting of the insert and the fusible core by a protuberance on the fusible core itself, which has a shape which is suitable for mounting the assembly in suitable position within the molding cavity of the part.

The passage hole created by the holding pin or by the protuberance of the fusible core in the covering of the molded hollow body is advantageously in order used in order, after molding to evacuate the molten metal coming from the fusible portion of the core, either simply by gravity or, in cases which are difficult due to the shape or position of the insert or the presence of ribs within the hollow body, by blowing or suction with suitable means. Total evacuation of the molten metal can be verified by weighing or by well-known electrical or radiographic means in a case of doubt as to verify complete evacuation of the fusible portion of the core.

Finally, in certain cases it may be advantageous to use one or more additional pins in order to hold the assembly formed by the insert and its fusible core in proper position within the cavity during the injection of the plastic material. These holding pins can be pushed back during the molding either by the injected plastic material itself or by servo mechanism like that described in detail in the applicant's French patent publication A-2 556 645.

Other advantageous aspects of the present invention will become evident from a reading of the following detailed description of one embodiment of a hollow body in accordance with the invention, given by way of illustration and not of limitation and show), in the accompanying drawings.

DESCRIPTION OF THE PREFERRED EMBODIMENTS

Figure 1:
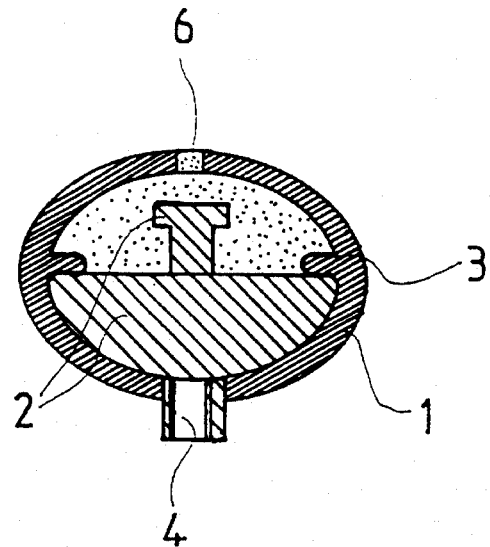
FIG. 1 is a diagrammatic sectional view of a hollow body in accordance with the invention.

FIG. 1 is a diagrammatic cross section of a golf-club head in accordance with the present invention. It comprises essentially a completely closed outer hollow body 1 made preferably of injected thermoplastic material having an insert 2 arranged within the body 1 which is held in place there by, for instance, ribs, such as 3 which are molded integral with the hollow body 1.

The insert 2 may comprise one or more assembled parts made of any suitable material, for instance, a metal, a plastic or another material. The insert occupies part of the inner volume of the body 1. Its weight and its fixed position are adjusted so as to impart the desired characteristics to the golf-club head, suitable for the driving of the ball. A tail 4, integral with the insert 2, enables subsequent mounting of the head on the shaft of the golf club.

In order to produce a piece of this type, the fusible core process described in the aforementioned patents is used. In that process, the insert 2 is first overmolded by a fusible soft metal having a suitable selected melting point, as shown diagrammatically in FIG. 2. This produces an assembly 5 formed of the insert 2 and the overmolded metal part 51. During the overmolding phase, the insert 2 is held in position by its tail 4. The same arrangement subsequently positions the assembly 5 of the core in the overmolding mold of the cover 1.

Once overmolding is effected, the part is heated to a suitable temperature which permits melting of the fusible metal constituting the portion 51 of the core 5, without thereby affecting the plastic material constituting the cover 1 of the hollow body as the incipient melting or deformation the cover must be avoid.? The metal thus melted is emptied through a hole 6 provided in the hollow body 1 at a selected point. This hole 6 can then be closed in suitable manner, as will be seen further below.

Figure 2:
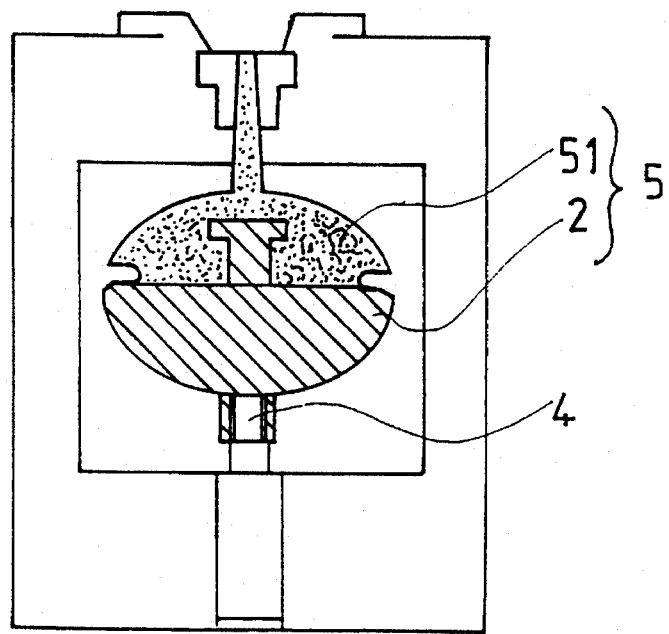
FIG. 2 is a diagrammatic sectional view of the molding of the assembly consisting of the insert and its fusible core.
Figure 3:
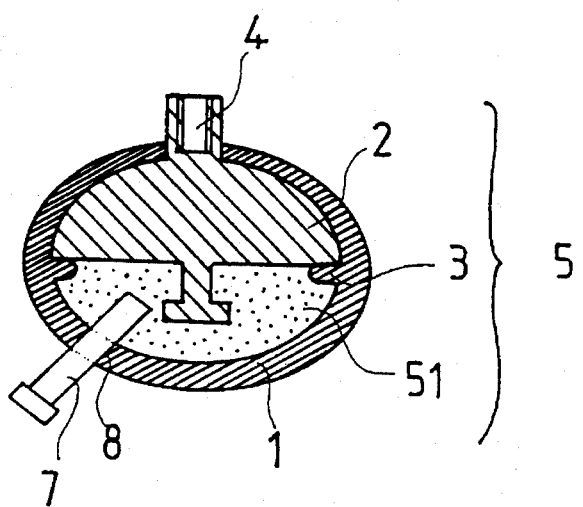
FIG. 3 is a diagrammatic sectional view of the holding of the assembly by a pin.

FIG. 3 illustrates the case in which the core 5 formed by the insert 2 and the fusible portion 51 cannot be maintained in the overmold cavity from the outside, because the tail 4 is for instance absent, insufficient, or poorly placed. In this case, a pin 7 penetrates into the fusible metal 51 at a suitable place in order to hold the assembly of the core 5 within the overmold cavity. The pin 7 passing through the cover 1 assures the assembly 5 consisting of the insert 2 and the fusible core 51 is held in suitable radial, axial, or other position within the cavity. The injection is preferably effected at a point located opposite the pin 7 so that the effects of the high filling pressures tend to push the assembly back to its seat on the pin 7. As is well known in the art of injection molding, vents which are suitably dimensioned to avoid burning or overheating of material are provided on the side opposite the point of injection, for instance around the additional support pin or pins 10 (FIG. 6) or the tail 4 of the assembly 5 (FIG. 2).

Furthermore, the pin 7 can advantageously be so arranged as to permit a transfer of heat by fluid circulation, heat conduction, or any other means, in order to regulate the temperature of the core during the phase of the cooling of the injected material and to avoid premature melting of the fusible core or else, conversely, in order subsequently to heat the fusible core 51 and facilitate its evacuation from the finished part.

The pin 7 can also be replaced in certain cases by a protuberance integral with the fusible portion 51 of the core which is suitably shaped to hold the assembly 5 in the cavity during molding.

Figure 4A:
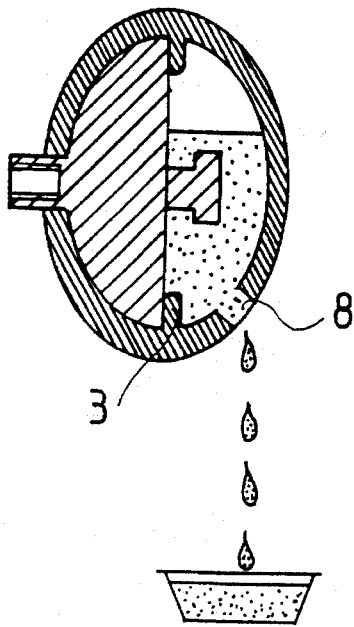
FIGS. 4a and 4b are basic diagrams of two methods of evacuating the molten metal coming from the fusible core.
Figure 4B:
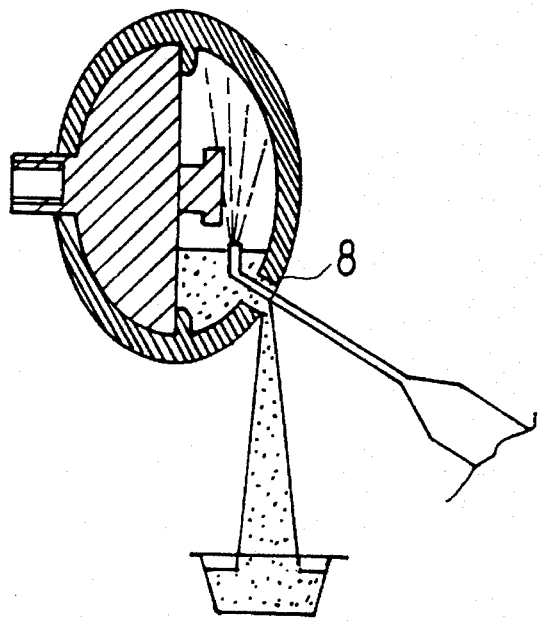
Figure 5:
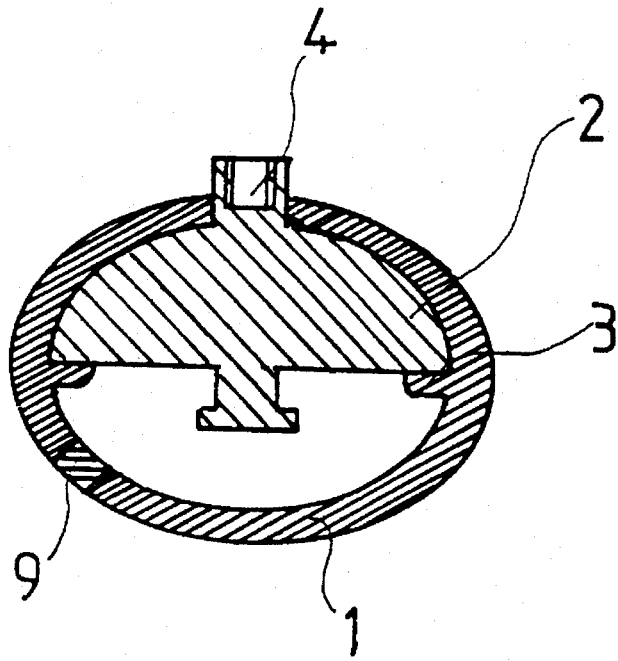
FIG. 5 is a diagrammatic cross-sectional view of a variant embodiment of a hollow body in accordance with the invention.

The hole 8 created in the cover 1 of the hollow body for the passage of the pin 7 or of the extension of the fusible part 51 described above is advantageously used to subsequently evacuate the molten metal coming from the fusible part 51 of the core 5, after the molding of the cover 1, as illustrated in FIGS. 4a and 4b.

As shown in FIG. 4a, a position of the body is selected which permits the draining of the molten metal by gravity, taking into account the presence of the inserts or of the holding ribs 3 within the hollow body 1, as well as the internal shapes of the cavities in order to obtain total evacuation of the melted metal.

If evacuation by gravity is not sufficient, the orifice 8 can permit the passage or attachment of blow or suction nozzles, as illustrated in FIG. 4b.

At the end of the discharge of the melted metal, in case of doubt, recourse can be had to a method of verification by weighing the part or by conventional electric or radiographic means in order to verify that all of the metal of the fusible part 51 has actually been evacuated.

When all the melted metal has been evacuated, the passage hole 8 is plugged by a plug or pill 9 as illustrated in FIG. 9. This plug 5 can be clipped, welded, bonded or fastened by any other suitable means. The plug 9 can easily reconstitute the outer shape of the cover 1 of the golf-club head or else be of functional use for marking, possible legends, or even the possible filling of the hollow body.

Figure 6:
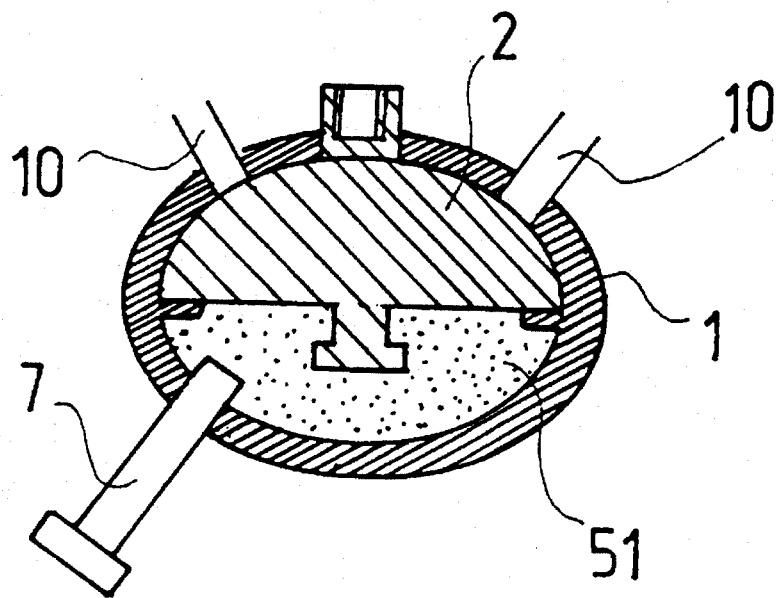
FIG. 6 is a basic diagram showing holding by additional pins of the assembly consisting of the insert and the fusible core.

In certain cases, as shown in FIG. 6, in order to avoid displacement of the assembly 5 formed by the insert or inserts 2 and the fusible core 51 during the injection in the plastic material which involves substantial pressures required for the proper filling of the cavity upon the production of thin-walled parts, it may be advantageous to use one or more additional pins 10 in order to hold the assembly 5 in its correct position within the mold cavity of the cover 1 of the hollow body. These pins may be pushed back, either by the plastic material itself upon the injection or by a control device, as taught in French patent publication A-2 556 645, mentioned above.

The carrying out of the process in accordance with the present invention is not limited to the embodiments which have just been described but may give rise to numerous variants without going beyond the scope of the present invention. The shape and position of the pins for the holding the assembly 5 formed of the insert or inserts 2 and the fusible part 51 of the core may, for instance, vary greatly. Likewise, that assembly 5 can be produced by the assembly of several parts.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A method of producing a hollow body with an insert therein occupying less than the entire hollow volume of the hollow body, the method comprising:

placing an insert having a first part with an external shape which is shaped to define part of the final shape of the interior of the hollow body to be molded and having a second part which is to be facing into the hollow of the hollow body after it is molded;

overmolding a core of fusible material over the second part of the insert, so that the core has a third part which is on the second part of the insert and has a fourth part with an external shape which is also shaped to define another part of the final shape of the interior of the hollow body, and so that the insert and the core of fusible soft material together define an assembly for being further overmolded;

overmolding over the first part of the insert and the fourth part of the core a cover of a material which is adapted not to melt when the core of fusible material melts for forming the overmolded body over the insert and the core;

melting the fusible material of the core without melting the material of the cover and removing the melted fusible material from inside the body while the insert remains inside the body producing a hollow space in the body.

2. The method of claim 1, wherein the fusible material of the core is a fusible soft metal material.

3. The method of claim 2, wherein the overmolded cover which is overmolded over the insert and the core is comprised of a plastic material cover.

4. The method of claim 1, wherein the overmolded cover which is overmolded over the insert and the core is comprised of a plastic material cover.

5. The method of claim 1, further comprising holding the insert and the core in position during the overmolding of the insert and the core to form the body.

6. The method of claim 5, wherein the insert and the core are held in position during the overmolding by defining a portion of the insert to project outward and through the overmolded cover.

7. The method of claim 6, wherein the insert and core are held in position during the overmolding by installing a pin in the core and passing through the overmolded cover.

8. The method of claim 7, further comprising transferring heat to the core for melting the core along the pin extending into the core.

9. The method of claim 5, wherein the holding of the insert and core during the overmolding of the cover is done through means defining an opening in the cover and into the cavity.

10. The method of claim 9, further comprising plugging the opening in the body defined in the overmolded cover.

11. The method of claim 1, further comprising forming a protuberance on the fusible core during the molding thereof wherein the insert and core are held in position during the overmolding via the protuberance molded integrally with the fusible core.

12. The method of claim 1, further comprising removing the melted fusible soft metal from the hollow body through an opening defined in the hollow body.

13. The method of claim 1, further comprising during the overmolding of the cover, forming a removal opening through the cover communicating into the hollow body for removal through the opening of melted fusible material of the core.

14. The method of claim 13, further comprising closing the removal opening after removal of the melted fusible material from the hollow body.

15. The method of claim 1, further comprising holding the insert in position in the hollow body during and after removal of melted fusible material from the hollow body.

* * * * *